United States Patent Office 3,257,372
Patented June 21, 1966

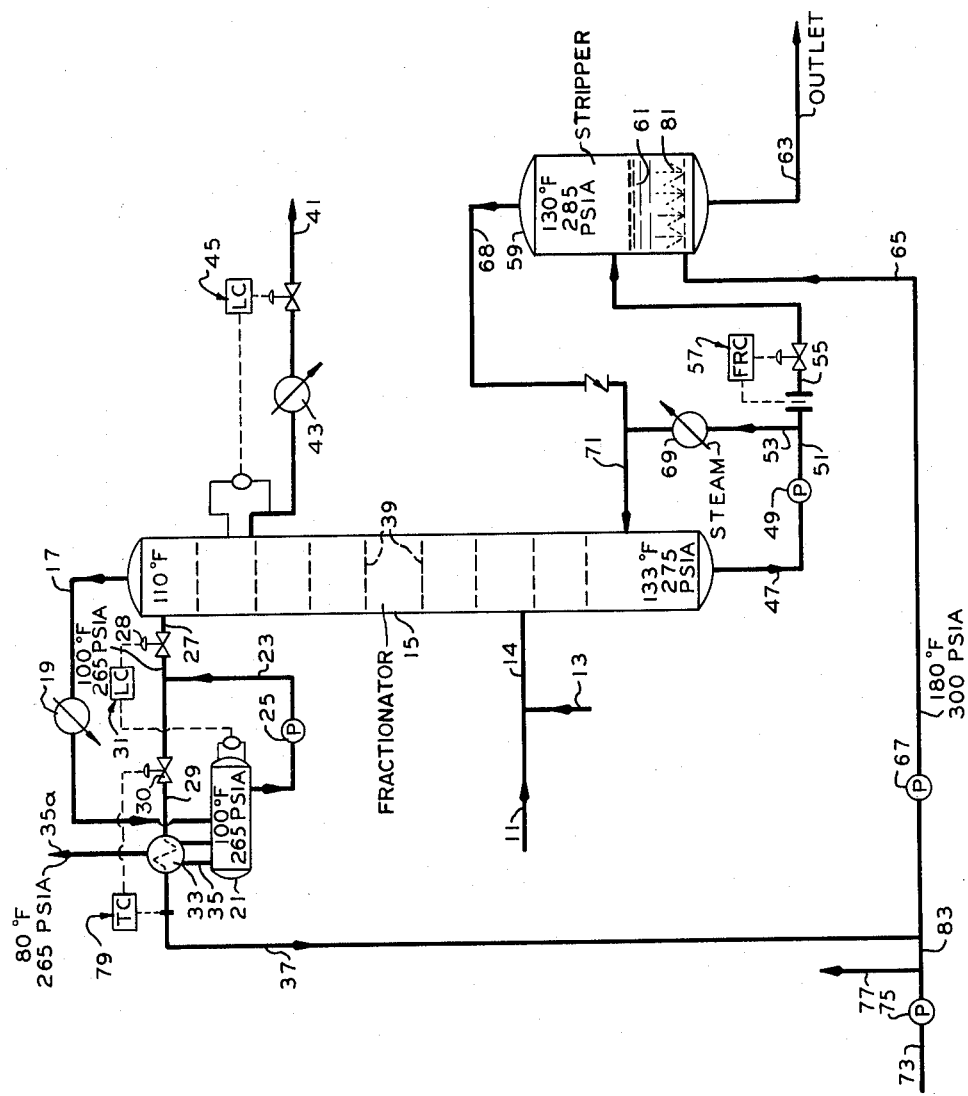

3,257,372
PREPARATION OF SOLUBLE POLYMER AND CATALYST RESIDUES BY CONCENTRATION PROCESS
John J. Moon, Bartlesville, Okla., assignor to Phillips Petroleum Company, a corporation of Delaware
Filed Oct. 5, 1962, Ser. No. 228,711
8 Claims. (Cl. 260—93.7)

This invention relates to handling of soluble polymer in a process for the production of solid, insoluble polymer. In one aspect it relates to a method and apparatus for preparing a soluble polymer for disposal in a process for the production of solid, insoluble polypropylene, with the loss of a minimum amount of propylene. In another aspect it relates to method and apparatus for the concentration of soluble polymer and organometallic catalyst residues contained in the propylene washings from a polypropylene catalyst removal operation.

In one instance, propylene is polymerized in a mass polymerization operation in the presence of hydrogen and a catalyst consisting of diethyl aluminum chloride and a titanium trichloride complex. The titanium trichloride complex is prepared by reacting titanium tetrachloride with aluminum, and the complex so prepared comprises, in one instance, 4.74 weight percent aluminum, 25.0 weight percent titanium, and 69.8 weight percent chlorine. In this polymerization operation a purified feed stream of liquid propylene containing a small amount of free hydrogen and the titanium trichloride complex are introduced into a loop reactor. The diethyl aluminum chloride is separately introduced into the reactor. This reactor is operated at a temperature of about 130° F. and at a pressure of about 400 p.s.i.a. (pounds per square inch absolute). This temperature is maintained in the loop reactor by circulating water through heat exchange jackets with which the loop reactor is provided. Residence time of the reactant materials in the reactor is about three hours. An effluent stream containing solid polymer in particle form, liquid propylene containing soluble polymer, and catalyst residues is removed from the loop reactor. This effluent stream usually contains about 30 to 35 weight percent solid polymer. On occasions this effluent stream contains as high as 40 weight percent solid polypropylene, and about 3.7 weight percent of soluble polymer.

The effluent stream from the loop reactor is passed into a contact tank also into which acetylacetone as a chelating agent and propylene oxide as an auxiliary additive to consume hydrogen chloride liberated by reacting acetylacetone with the aforesaid catalyst, are added. In this tank, the solid polymer is brought into intimate contact with the acetylacetone and propylene oxide at a temperature of from 100 to 140° F. and a pressure of 400 p.s.i.a. Following a 30-minute contact the treated effluent stream is then passed into a wash tank in which it is contacted in countercurrent flow with liquid propylene. About 4 pounds of liquid propylene per pound of polymer is employed as the wash liquid. Washed polymer as a 50 weight percent slurry of solid polymer in liquid propylene is withdrawn from the bottom of the wash tank and is passed to subsequent treatment for recovery of polymer.

A stream containing liquid propylene, catalyst residues, and soluble polymer is taken overhead from the wash tank and passed into a cyclone separator. Solid polymer is inadvertently carried with this wash liquid is separated out in the cyclone and returned to the wash tank. Alternatively, the overhead stream is filtered. This wash tank is maintained under a pressure of about 400 p.s.i.a. This wash tank or cyclone separator overflow washings comprises the feed stream containing about one and one-half percent by weight of soluble polymer and a small percentage of catalyst residues which are to be separated for disposal according to this invention.

The problem which this invention solves is the concentration of the washings with respect to the soluble polymer and catalyst residues to contain as little propylene as possible to minimize the loss of this latter material.

Accordingly, an object of this invention is to provide a process for preparing the above-mentioned polymer washings containing soluble polymer and catalyst residues for disposal so as to minimize loss of propylene. Another object of this invention is to provide apparatus and a process for recovering as much propylene as possible from the catalyst washings to minimize loss of propylene in the concentrated soluble polymer and catalyst residue product. Still other objects and advantages of this invention will be realized upon reading the following description which, taken with the attached drawing, forms a part of this specification.

The drawing illustrates, in diagrammatic form, an arrangement of apparatus parts suitable for carrying out the process of this invention.

In the drawing, reference numerals 11 and 13 identify conduits conducting washings from several sources to a conduit 14 through which these combined washings pass into a fractionator vessel 15. These washings, as mentioned hereinbefore, contain largely liquid propylene and some propane along with the soluble polymer and catalyst residues, the latter materials to be separated for disposal. In one instance this fractional distillation column 15 is operated in such a manner as to maintain the top column temperature of about 111° F. and a kettle temperature of about 133° F., the pressure in the column kettle being about 275 p.s.i.a. (pounds per square inch absolute). With the column being operated under these pressure and temperature conditions only propylene and propane with, of course, any hydrogen present leave the top of the column through conduit 17 which is provided with a condenser 19, with condensate and uncondensed gases therefrom entering an accumulator vessel 21. Reflux liquid for passage to column 15 leaves accumulator 21 through a conduit 23 provided with a pump 25 and a conduit 27 provided with a flow control valve 28 operated by a liquid level control assembly 31. Conduit 27 is actually one branch from conduit 23, the other branch therefrom being a conduit 29. This conduit 29 passes liquid condensate from accumulator 21 through a condenser 33 which condenses condensable material rising from the accumulator 21 in a conduit 35. Hydrogen with an equilibrium amount of propylene and propane issue as off-gases from condenser 33 by way of a conduit 35a. Valve 30 in conduit 29, which is actuated by a temperature controller apparatus 79 in response to temperature on the downstream side of condenser 33, provides for pressure reduction and expansion so as to provide refrigeration for condenser 33. On passing through this valve propylene vaporizes thereby providing said refrigeration. This operation of fractionator 15 allows withdrawal of a side stream propylene product through a conduit 41. This side stream withdrawal is regulated by a level controller apparatus 45 and provides for withdrawal of propylene containing a small amount of propane for return to the original polymerization step of the overall operation. A cooler 43 is provided in conduit 41 for cooling this side product stream. The fractionator is provided with suitable vapor-liquid contacting trays 39 as desired.

The bottoms material in fractionator 15 is withdrawn through a conduit 47 by a pump 49 which discharges into a conduit 51. A portion of the liquid flow from conduit 51 is passed through a bypass conduit 53, is heated in a reboiler heat exchanger 69 and passed on through a conduit 71 for return to the kettle section of the fractionator.

The remainder of the bottoms material from conduit 51 passes through a conduit 55, the flow of which is regulated by a flow recorder-controller assembly 57. This flow recorder-controller assembly is set to allow passage of an amount of bottoms material equivalent to the soluble polymer and catalyst residues introduced into fractionator 15 through conduit 14. From conduit 55, this bottoms material passes into an evaporator or stripper vessel 59 provided wtih spray-producing apparatus 81. This spray-producing apparatus can, if desired, be spray nozzles or it can merely be a perforate ring for breaking up gas passing therethrough into fine bubbles for promoting a stripping action. The vapor passing through conduit 37 enters a conduit 83 just upstream of a compressor 67 in which this gas is compressed to a pressure of about 300 p.s.i.a. Upon being compressed to this pressure the gas acquires a temperature of about 180° F. At this pressure and temperature the gas passes from compressor 67 through a conduit 65 into the spray ring or spray nozzles 81. Reference numeral 61 identifies the body of liquid in the lower portion of vessel 59. Upon spraying upwardly through liquid 61, this heated stripping gas by its sensible heat evaporates propylene from the liquid and the propylene combined from these sources leaves the upper portion of vessel 59 through a conduit 68. By this means, no heat exchange surface is fouled with concentrated polymer. Conduit 68 connects with conduit 71 so that the gases from conduit 68 are combined with the reboiled and heated liquid passing through conduit 71 and the combined stream then enters the reboiler section of fractionator 15.

A conduit 63 connects the bottom of the stripper vessel 59 with a point of disposal and the finally concentrated solution of soluble polymer and catalyst residues in propylene leaves this vessel through this conduit. Up to the present time and as far as is known, this soluble polymer does not have any commercial value, and in some instances it is burned for disposal. Because of this type of disposal the soluble polymer and catalyst residues are concentrated as much as possible to minimize the loss of propylene accompanying these materials through conduit 63.

Since liquid propylene is withdrawn from fractionator 15 through conduit 41 for recycling to the propylene polymerization step, additional propylene from a source, not shown, enters this system through a conduit 73 provided with a compressor 75. In some instances more propylene than is required in the operation of fractionator 15 and stripping vessel 59 enters the system through conduit 73 and the portion not required is passed through a conduit 77 for other use.

The following tabulation is a material balance, in terms of pounds per stream day, of material in process in various apparatus parts illustrated in the drawing.

The entry in the tabulation "chemical reaction product" includes the products resulting from the reaction of the acetylacetone and propylene oxide with the titanium chloride complex and the diethyl aluminum chloride materials remaining in the reactor effluent and contained in the propylene washings, the latter being the feed materials to the present operation.

One of the advantages of this invention is that as the concentration of the soluble polymer in evaporator vessel 59 increases, there is a tendency for some of this soluble polymer to be entrained and carried overhead from vessel 59 through conduit 68. In this case such carryover is immaterial because the overhead gases passing through conduit 68 are reinjected into the fractionator by way of conduit 71. In this manner the carryover soluble polymer is reconcentrated in the kettle product of the fractionator and returned to the evaporator 59.

A complete description of the actual polymerization operation, addition of the acetylacetone and propylene oxide chemicals for catalyst removal and of the washing operation is given fully and completely in a copending application, Serial No. 174,002, filed February 19, 1962. As set forth in this copending application, other chemicals than the acetylacetone can be employed in place of the acetylacetone and also other chemicals than the propylene oxide can be used in its place. These other materials as well as other catalyst materials which are suitable for the general polymerization operation are fully described in said copending application.

Another copending application, Serial No. 190,263, filed April 26, 1962, fully describes the mechanism involved in the treatment of the polypropylene reactor effluent for removal of the catalyst therefrom. This latter copending application also discloses other chemical additives than the acetylacetone and propylene oxide which can be used in the destruction of the catalytic activity of the reactor effluent.

While certain embodiments of the invention have been described for illustrative purposes, the invention obviously is not limited thereto.

That which is claimed is:

1. A process for the recovery of wash liquid substantially free of polymer from washings obtained by washing a solid olefin polymer in admixture with soluble polymer of the same olefin and monomer of said olefin, said monomer being in major proportion in said washings, and separating the washings from the solid polymer, said process comprising the steps of:

(a) fractionally distilling said washings in a fractional distillation zone, recovering an overhead vapor stream consisting principally of said monomer and lighter material in minor amount, a bottoms liquid stream consisting principally of said monomer and said soluble polymer in substantially higher concentration than in said washings, and a side stream consisting prin-

*Material balance—Pounds per stream day*

| Component | Stream No. | | | | | | | | | | | |
|---|---|---|---|---|---|---|---|---|---|---|---|---|
| | 14 | 17 | 35 | 53 | 55 | 37 | 65 | 73 | 27 | 61 | 63 | 41 |
| Hydrogen | 45 | 154 | 45 | | | 1 | 1 | | 108 | 1 | | |
| Propylene | 633,079 | 945,289 | 3,000 | 2,579,082 | 69,296 | 13,737 | 246,525 | 235,063 | 928,552 | 307,639 | 8,182 | 855,315 |
| Propane | 42,792 | 33,252 | 122 | 573,742 | 15,415 | 483 | 13,209 | 12,850 | 32,647 | 27,813 | 811 | 54,585 |
| n-Pentane | 1,220 | | | 332,790 | 8,941 | | 174 | 175 | | 7,724 | 1,394 | |
| Soluble Polymer | 10,342 | | | 384,933 | 10,342 | | | | | | 10,342 | |
| Acetylacetone | 945 | | | 35,172 | 945 | | | | | | 945 | |
| Propylene oxide | 101 | | | 3,741 | 101 | | | | | | 101 | |
| Chemical Reaction Products | 2,211 | | | 82,345 | 2,211 | | | | | | 2,211 | |
| Total, lb./s.d.[1] | 691,365 | 978,695 | 3,167 | 3,991,805 | 107,251 | 14,221 | 259,909 | 248,088 | 961,307 | 343,174 | 23,986 | 909,900 |
| G.p.m. at 60° F.[2] | 101 | | | 595 | 16 | | | | | 154 | 1 | 146 |
| S.c.f.-m.[3] | | 6,137 | 25 | | | 91 | 1,619 | 1,545 | | 2,120 | | |

[1] Pounds per stream day.
[2] Gallons per minute, 60° F.
[3] Standard cubic feet per minute.

cipally of said monomer substantially free of said light material as the recovered wash liquid;
(b) passing a substantial portion of the bottoms stream of step (a) in liquid form into an evaporation zone, compressing vaporous monomer from the overhead stream of step (a) and passing the resulting hot monomer in vapor form upwardly thru the liquid bottoms in said evaporation zone to vaporize liquid monomer therein, and recovering from said evaporation zone an overhead vapor stream of monomer and a liquid bottoms stream of lower concentration of monomer and higher concentration of soluble polymer than their respective concentrations in said first mentioned bottoms stream; and
(c) passing the overhead monomer stream of step (b) into a lower section of said distillation zone of (a).

2. The process of claim 1 including the steps of:
(d) dividing the bottoms stream of step (a) into two streams;
(e) passing one stream from step (d) to the evaporation zone of step (b); and
(f) heating the other stream of step (d) and passing the heated stream in liquid form into the lower section of the distillation zone of step (a) as reboiling liquid.

3. The process of claim 1 wherein said wash liquid comprises principally propylene, propane, soluble polypropylene, and minor amounts of hydrogen, and the distillation zone of step (a) is operated at superatmospheric pressure and the vaporous monomer is compressed in step (b) to a higher superatmospheric pressure than the pressure in said distillation zone, and including the steps of:
(d) condensing the major portion of the propylene and propane in the overhead vapor stream of step (a), leaving the hydrogen and a minor portion of the propylene and propane in vapor form;
(e) separating the condensate from the vapor of step (d);
(f) passing one portion of the condensate of step (e) to an upper section of the distillation zone of step (a) as reflux liquid; and
(g) expanding the other portion of condensate of step (e) in indirect heat exchange with the uncondensed portion of the overhead stream of step (d) to vaporize said other portion and passing the resulting vapor to the comprising phase of step (b).

4. The method of claim 1 wherein said washings contain catalyst residue and reaction products thereof, and the evaporation zone bottoms liquid recovered in step (b) also contains catalyst residue and reaction products in greater concentration than their concentration in said washings.

5. A process for recovering propylene from a mixture comprising principally propylene in major proportion, a soluble polymer of propylene in minor but substantial proportion, and a lesser proportion of other fluid materials, which comprises the steps of:
(a) passing said mixture in liquid phase into an intermediate section of a fractional distillation zone so as to recover an overhead vapor fraction consisting principally of polypropylene and any lighter fluid materials in said mixture, a side cut consisting principally of propylene as the recovered product, and a bottoms fraction consisting principally of propylene and said polymer;
(b) passing a substantial portion of the liquid bottoms fraction of step (a) into a vaporization zone;
(c) compressing a substantial portion of the overhead vapor fraction of step (a) to a pressure above the pressure in the vaporization zone of step (b) and passing the resulting hot vapor upwardly thru the liquid in said vaporization zone so as to vaporize additional propylene therefrom;
(d) withdrawing from the vaporization zone of step (b) liquid of reduced propylene concentration and increased polymer concentration relative to the liquid passed thereto;
(e) heating a substantial portion of said liquid bottoms fraction and passing the heated liquid to the lower section of the distillation zone of step (a) as reboiler liquid; and
(f) withdrawing from the vaporization zone of step (b) a vapor stream of propylene and combining it with said reboiler liquid and passing same into a lower section of the distillation zone of step (a).

6. The method of claim 5 wherein said mixture comprises washings prepared in an operation comprising reacting in a polymerization reaction propylene in the presence of a catalyst comprising a $3TiCl_3 \cdot AlCl_3$ complex and diethylaluminum chloride at a temperature of about 100° to 140° F. at a pressure sufficient to maintain the propylene in the liquid state thereby producing a major proportion of a solid polypropylene and a minor proportion of a soluble polypropylene, to the reaction products adding acetylacetone as a chelating agent and adding propylene oxide as an auxiliary additive to consume hydrogen chloride liberated by reaction of said acetylacetone with said catalyst, separating said soluble polymer from the reaction products, and washing the separated solid polymer with liquid propylene thereby producing said washings, and the recovered propylene is recycled to the polymerization reaction.

7. An apparatus comprising, in operable combination, a fractional distillation tower, said tower being provided with a side feed inlet, a side product outlet, an overhead vapor outlet, and a bottoms liquid outlet; a vaporization vessel; a first conduit communicating said bottoms liquid outlet with said vaporization vessel at an intermediate level thereof; a second conduit communicating the upper portion of said vaporization vessel with a bottom section of said distillation tower; a bottoms product outlet in said vaporization vessel; a third and by-pass conduit between said first and second conduits, said third conduit including a reboiler heat exchanger; a spray means in the lower portion of said vaporization vessel; a fourth conduit leading from a source of stripping gas to said spray means, said fourth conduit including a compressor; a reflux accumulator; a fifth conduit having a reflux condenser leading from said overhead vapor outlet to said reflux accumulator; a sixth conduit leading from said accumulator to the upper portion of said tower for passage of reflux thereto; and a seventh conduit communicating between said sixth conduit and said fourth conduit upstream of said compressor; a gas vent in communication with said accumulator; a knockback condenser in communication with said gas vent, said knockback condenser being positioned in said seventh conduit for passage of refrigerant therethrough; and a pressure reducing valve in said seventh conduit intermediate said knockback condenser and said sixth conduit.

8. Apparatus comprising in combination:
(1) a fractional distillation tower having a side inlet for feed, an overhead outlet, a reflux inlet, a side stream outlet in an upper section, and a liquid bottoms outlet;
(2) a vaporization vessel having a liquid feed inlet at an intermediate level, a vapor inlet at a lower level leading to vapor distribution means therein, an overhead vapor outlet, and a bottoms liquid outlet;
(3) a first conduit connecting the bottoms outlet of (1) with the liquid feed inlet of (2) with means therein for pumping feed to said vessel;
(4) a second conduit connecting the overhead vapor outlet of (2) with a lower section of said tower;
(5) a third conduit connecting the first conduit of (3) with a lower section of said tower, said third conduit having a reboiler heating means therein;
(6) an accumulator connected by a fourth conduit with the overhead vapor outlet of said tower, said fourth conduit having a condenser therein;

(7) a fifth conduit leading from the lower section of the accumulator of (6) to the reflux inlet of (1); and (8) a sixth conduit leading from the fourth conduit of (6) to the vapor inlet of the vessel of (2), said sixth conduit having compressor means therein.

References Cited by the Examiner

UNITED STATES PATENTS

| | | | |
|---|---|---|---|
| 1,853,743 | 4/1932 | Pollitzer | 62—24 |
| 2,403,922 | 7/1946 | Hawthorne | 196—134 X |
| 2,448,092 | 8/1948 | Gibson | 202—46 X |
| 2,500,934 | 3/1950 | Dean. | |
| 2,555,939 | 6/1951 | Sherwin | 202—70 X |
| 2,568,889 | 9/1951 | Hanson et al. | 202—71 X |
| 2,619,814 | 12/1951 | Kniel | 202—75 X |
| 2,912,365 | 11/1959 | Irvine | 202—75 X |
| 2,974,132 | 3/1961 | Jacobi et al. | 260—94.9 |
| 2,982,763 | 5/1961 | McLeod | 260—94.9 |
| 3,002,358 | 10/1961 | Dierl | 62—23 |
| 3,007,852 | 11/1961 | Hunter et al. | 202—46 |
| 3,066,124 | 11/1962 | Telfer | 260—93.7 X |
| 3,098,845 | 7/1963 | Cull et al. | |

FOREIGN PATENTS

| | | |
|---|---|---|
| 1,114,168 | 9/1961 | Germany. |
| 866,421 | 4/1961 | Great Britain. |
| 873,890 | 8/1961 | Great Britain. |

NORMAN YUDKOFF, *Primary Examiner.*

ROBERT F. BURNETT, GEORGE D. MITCHELL,
*Examiners.*

W. L. BASCOMB, F. E. DRUMMOND,
*Assistant Examiners.*